(12) United States Patent
Ross et al.

(10) Patent No.: US 10,205,157 B2
(45) Date of Patent: *Feb. 12, 2019

(54) ELECTRODE FOR LEAD ACID STORAGE BATTERY

(71) Applicant: Johnson Controls Technology Company, Plymouth, MI (US)

(72) Inventors: William J. Ross, Mukwonago, WI (US); Christopher P. Kaniut, Jacksonville, FL (US); Margaret Teliska, Holland, MI (US); Dennis A. Wetzel, Saline, MI (US)

(73) Assignee: Johnson Controls Technology Corporation, Milwaukee, WI (US)

( * ) Notice: Subject to any disclaimer, the term of this patent is extended or adjusted under 35 U.S.C. 154(b) by 255 days.

This patent is subject to a terminal disclaimer.

(21) Appl. No.: 15/175,460

(22) Filed: Jun. 7, 2016

(65) Prior Publication Data

US 2016/0293937 A1    Oct. 6, 2016

Related U.S. Application Data

(62) Division of application No. 13/522,793, filed as application No. PCT/US2011/021872 on Jan. 20, 2011, now Pat. No. 9,379,378.

(Continued)

(51) Int. Cl.
*H01M 2/16* (2006.01)
*H01M 4/14* (2006.01)
(Continued)

(52) U.S. Cl.
CPC .......... *H01M 4/14* (2013.01); *H01M 2/1653* (2013.01); *H01M 4/20* (2013.01); *H01M 4/22* (2013.01);
(Continued)

(58) Field of Classification Search
CPC ...... H01M 4/14; H01M 10/06; H01M 2/1653; H01M 4/20; H01M 4/22; H01M 10/12;
(Continued)

(56) References Cited

U.S. PATENT DOCUMENTS 3,922,175 A * 11/1975 Granqvist ............... H01M 4/02
429/160
4,342,343 A    8/1982 Clague et al.
(Continued)

FOREIGN PATENT DOCUMENTS

| JP | 56 050058 A | 5/1981 |
| JP | 58 209066 A | 12/1983 |
| JP | 59 056367 A | 3/1984 |

OTHER PUBLICATIONS

International Preliminary Report on Patentability and Written Opinion of International Searching Authority dated Jul. 24, 2012 for International Application No. PCT/US2011/021872.
(Continued)

*Primary Examiner* — Lisa S Park
(74) *Attorney, Agent, or Firm* — Boardman & Clark LLP

(57) ABSTRACT

An electrode for a lead acid battery is provided. The electrode includes a pasting material distributed on the electrode and arranged to provide uniform current density. A lead acid battery having a plurality of electrodes, each electrode having pasting material providing uniform current density across the electrodes is also provided. A method for manufacturing a battery electrode is also provided and includes applying a portion of the electrode with a pasting material providing uniform current density.

23 Claims, 7 Drawing Sheets

Related U.S. Application Data

(60) Provisional application No. 61/296,502, filed on Jan. 20, 2010.

(51) Int. Cl.

| | | |
   |---|---|---|
   | *H01M 4/20* | (2006.01) | |
   | *H01M 4/22* | (2006.01) | |
   | *H01M 10/12* | (2006.01) | |
   | *H01M 10/06* | (2006.01) | |
   | *H01M 4/04* | (2006.01) | |
   | *H01M 4/21* | (2006.01) | |
   | *H01M 10/14* | (2006.01) | |

(52) U.S. Cl.
   CPC ........... *H01M 10/06* (2013.01); *H01M 10/12* (2013.01); *H01M 4/0404* (2013.01); *H01M 4/21* (2013.01); *H01M 10/14* (2013.01); *H01M 2220/20* (2013.01); *Y02E 60/126* (2013.01); *Y02P 70/54* (2015.11); *Y02T 10/7016* (2013.01)

(58) Field of Classification Search
   CPC .... H01M 10/14; H01M 2220/20; H01M 4/21; H01M 4/0404; Y02P 70/54; Y02E 60/126; Y02T 10/7016
   See application file for complete search history.

(56) References Cited

U.S. PATENT DOCUMENTS

| | | | |
|---|---|---|---|
| 4,417,608 A | 11/1983 | McCartney, Jr. et al. | |
| 5,276,960 A | 1/1994 | Wheadon et al. | |
| 5,296,320 A * | 3/1994 | Ginatta | H01M 10/18 429/210 |
| 6,569,560 B1 * | 5/2003 | Martin | H01M 2/1606 429/131 |
| 9,379,378 B2 | 6/2016 | Ross et al. | |
| 2003/0054237 A1 | 3/2003 | Zucker | |
| 2005/0084762 A1 | 4/2005 | Vaccaro et al. | |
| 2008/0299462 A1 * | 12/2008 | Whear | H01M 2/145 429/247 |

OTHER PUBLICATIONS

International Search Report dated May 26, 2011 for International Application No. PCT/US2011/021872.

Written Opinion of the International Searching Authority dated May 26, 2011 for International Application No. No. PCT/US2011/021872.

* cited by examiner

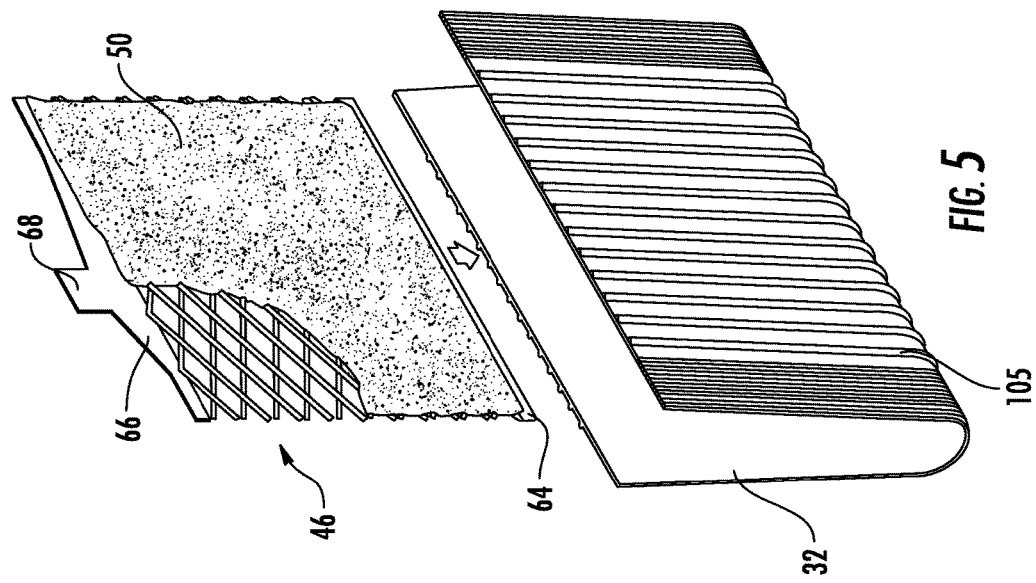
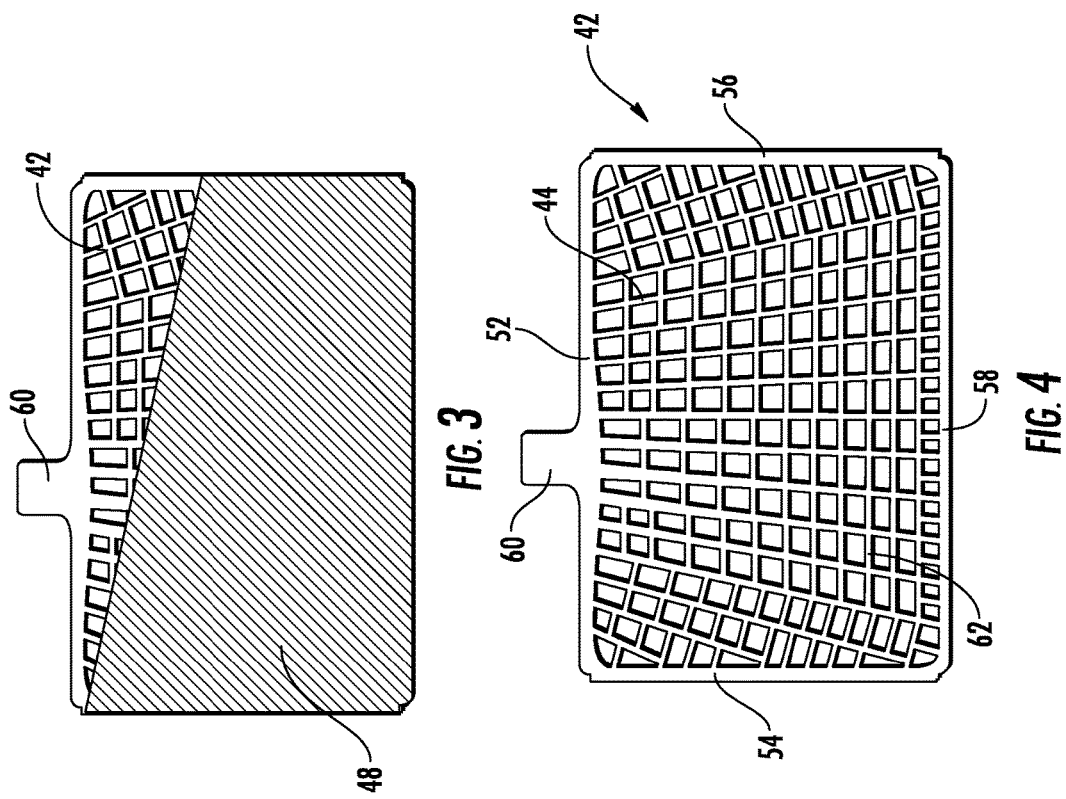

ELECTRODE FOR LEAD ACID STORAGE BATTERY

CROSS-REFERENCE TO RELATED APPLICATIONS

This application is a divisional of U.S. Non-Provisional patent application Ser. No. 13/522,793, filed Aug. 22, 2012, entitled "Electrode for Lead Acid Storage Battery," which claims priority to U.S. Provisional Patent Application, Ser. No. 61/296,502, filed Jan. 20, 2010, entitled "Electrode for Lead Storage Battery," and International Application PCT/US2011/021872 filed Jan. 20, 2011, the entire contents of each of which are hereby incorporated by reference in their entirety herein.

FIELD

The present inventions relate to the field of batteries (e.g. lead-acid batteries including batteries for vehicle starting, lighting and ignition applications; marine batteries; commercial batteries; industrial batteries; batteries for use with hybrid-electric vehicles, microhybrid vehicles, etc.). The present inventions more specifically relate to a lead storage battery electrode and a method for manufacturing same, and more particularly, to an electrode for a lead storage battery including a pasting material or paper with variable resistance.

BACKGROUND

Lead acid batteries are widely known as secondary batteries used in most vehicles. A typical lead acid battery may include several electrodes substantially submerged in an electrolyte (e.g., aqueous sulfuric acid). The electrodes include anodes, which may be made of an active material such as lead or a lead alloy, and cathodes, which may be made of an active material such as lead dioxide or another lead alloy. The electrodes chemically interact with the electrolyte to convert chemical energy into electrical energy and in some cases convert electrical energy into chemical energy. The electrodes typically include collection lugs.

Often, the electrodes are manufactured as pasted grids. Such electrodes may include a lead or lead alloy grid and a paste that includes red lead, dilute sulfuric acid and/or other additives, such as, for example, expanders. Paste may be provided on the grids and/or pressed into apertures defined by the grids and may then be dried or allowed to dry. Pasting paper may be provided on the electrodes during or after the pasting process.

Traditional batteries may also include separators provided between the electrodes. The separators may be made from, for example, wood, rubber, glass fiber, cellulose, sintered PVC/polyethylene, and/or any other known or later-developed insulating or non-electrically-conductive material.

A common occurrence in lead acid batteries is acid stratification. Acid stratification generally refers to the non-uniform concentration of electrolyte fluid within a lead acid battery. The electrolyte in a stratified battery concentrates toward the bottom, causing the upper half of the cell to be acid poor. Acid stratification may result from the battery being kept at a low charge without being fully charged during several charge/discharge cycles. For example, a vehicle that is only driven short distances often does not fully charge its starting, lighting and ignition (SLI) battery between successive starts of the vehicle. As a result, the battery may be maintained at a partial charge for an extended period of time and acid stratification may result. Acid stratification may reduce the performance of the battery and may eventually lead to a premature failure of the battery.

Acid stratification may also lead to sulfation in particular regions of the electrodes, such as for example on the lower portions of the electrodes. Sulfation generally refers to the formation of lead sulfate on one or more electrodes of a battery. Sulfation may result in crystallized lead sulfate formations that are difficult to break up or return to active material in the electrode and/or the electrolyte and may result in a loss of active material available to the electrode and the battery as a whole. Further, acid stratification and/or sulfation in a battery may result in the battery measuring a higher than actual open circuit voltage. As a result, the battery may appear to be fully charged when it actually may be only partially charged and may have a lower than expected cold cranking amps (CCA) value.

It has been found that uneven current density between two or more electrodes of a lead acid battery may contribute to acid stratification and/or sulfation within the lead acid battery.

SUMMARY

Accordingly, an electrode for a lead acid battery is provided. The electrode has a pasting material distributed on the electrode and arranged to provide uniform current density.

A lead acid battery is further provided. The lead acid battery includes a plurality of electrodes. Each electrode is provided with a pasting material distributed on the electrode and arranged to provide uniform current density across the electrodes.

A method for manufacturing a battery electrode is also provided. The method includes applying a portion of an electrode with a pasting material so as to provide uniform current density.

These and other features and advantages of various embodiments of systems and methods according to this invention are described in, or are apparent from, the following detailed description of various exemplary embodiments of various devices, structures, and/or methods according to this invention.

BRIEF DESCRIPTION OF THE DRAWINGS

Various examples of embodiments of the systems and methods according to the present disclosure will be described in detail, with reference to the following figures, wherein:

FIG. 3 is a front plan cut-away view of a portion of a battery plate or electrode (e.g. positive battery plate) comprising a stamped grid and active material according to one or more examples of embodiments;

FIG. 4 is a front plan view of a stamped grid (e.g. positive grid) according to one or more examples of embodiments;

FIG. 5 is an isometric cut-away view of a battery plate or electrode (e.g. negative battery plate) and separator according to one or more examples of embodiments;

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
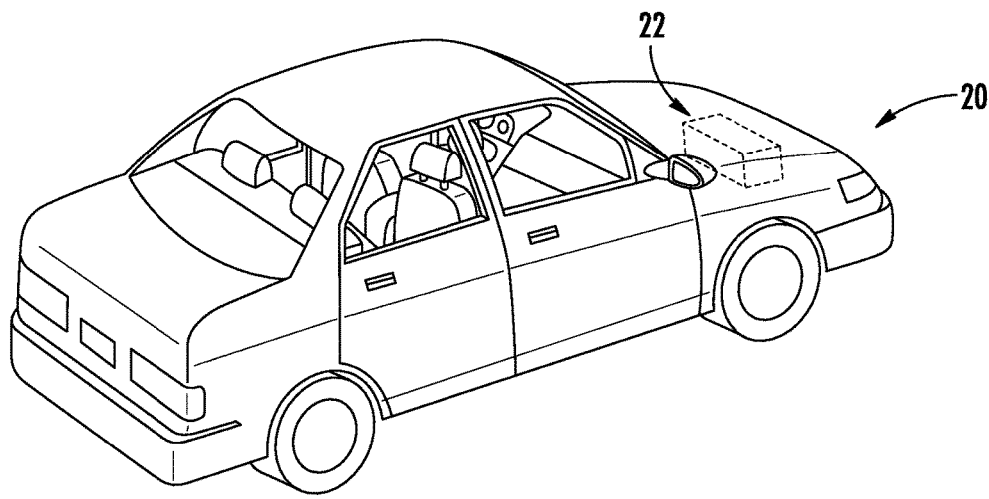
FIG. 1 is an isometric view of a vehicle including a battery according to one or more examples of embodiments.

Referring to FIG. 1, a vehicle 20 is shown that includes a battery 22 according to one or more examples of embodiments. FIG. 1 depicts a vehicle 20 with an electrical power storage device 22 (e.g., a battery). The size, shape, configuration, and location of an electrical power storage device and the type of vehicle may vary according to various examples of embodiments. For example, while the vehicle 20 shown is an automobile, according to various examples of embodiments, the vehicle may comprise a wide variety of different types of vehicles, including, among others, motorcycles, buses, recreational vehicles, boats, and the like. The electrical power storage module 22 may supply power for various vehicles, including, for example electric powered vehicle, hybrid electric vehicles, and gasoline powered vehicles. According to one or more examples of embodiments, the vehicle 20 uses an internal combustion engine or a hybrid or other drive for locomotive purposes.

The battery 22 shown in FIG. 1 is configured to provide at least a portion of the power required to start or operate the vehicle 20 and/or various vehicle systems (e.g., starting, lighting and ignition systems). Further, it should be understood that the battery 22 may be utilized in a variety of applications not involving a vehicle, and all such applications are intended to be within the scope of the present disclosure.

The battery 22 shown in FIG. 1 may include any type of secondary battery (e.g., rechargeable battery). According to one or more examples of embodiments, the battery includes a lead-acid storage battery. Various embodiments of lead-acid storage batteries may be either sealed (e.g., non-maintenance) or unsealed (e.g., wet). According to one or more examples of embodiments, the lead-acid storage battery is an unsealed lead-acid battery and periodically requires the addition of electrolyte and/or water to maintain a desired volume and/or concentration of either or both.

Figure 2:
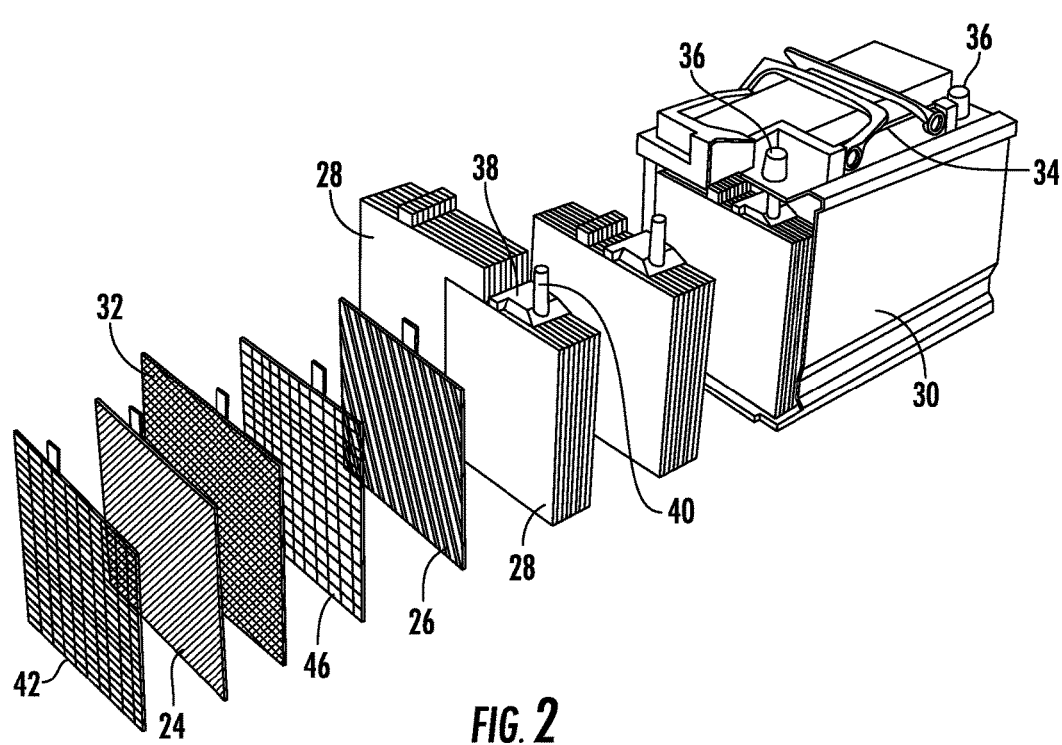
FIG. 2 is an isometric cut-away exploded view of a portion of a battery according to one or more examples of embodiments.

A lead-acid storage battery 22 according to one or more examples of embodiments is illustrated in FIG. 2. FIG. 2 depicts a cutaway exploded isometric view of an electrical power storage device 22 according to one or more examples of embodiments. The electrical power storage device 22 includes a plurality of electrochemical electrodes or plates 24, 26 and plate sets, generally designated 28 (e.g., lead-acid). Other configurations and electrical power storage devices, such as a battery, may be used in accordance with various other examples of embodiments. In various embodiments, the lead-acid storage battery 22 includes several cell elements which are provided in separate compartments of a container or housing containing electrolyte. The illustrations provided herein relate to automotive applications, wherein groups of 12-16 plates are used in each of six stacks for producing a standard automotive 12-volt battery. It will be obvious to those skilled in the art after reading this specification that the size and number of the individual grids, the size and number of plates in any particular stack, and the number of stacks used to construct the battery may vary widely depending upon the desired end use.

In various embodiments, the battery housing 30 includes a box-like base or container and is made of a moldable resin. A plurality of plate blocks are connected in series according to the capacity of the lead storage battery and are accommodated in the battery container or housing together with the electrolyte, which is most commonly aqueous sulfuric acid.

In various embodiments, the battery 22 includes a compartment 30 having a front wall, end walls, a rear wall and a bottom wall. In various embodiments, five cell partitions or dividers are provided between the end walls, resulting in the formation of six compartments, as typically would be present in a twelve volt automotive battery. In various embodiments, a plate block is located in each compartment, each plate block including one or more positive and negative plates 24, 26, each having at least one lug 60, 68, and optionally a separator material 32 placed between each positive and negative plate 24, 26.

A cover 34 is provided for the housing 30, and in various embodiments, the cover includes terminal bushings and fill tubes to allow electrolyte to be added to the cells and to permit servicing. To prevent undesirable spillage of electrolyte from the fill tubes, and to permit exhausting of gases generated during the electrochemical reaction, a battery may also include one or more filler hole caps and/or vent cap assemblies.

At least one positive and negative terminal post, generally designated 36, may be found on or about the top or front compartments of the battery. Such terminal posts 36 typically include portions which may extend through the cover and/or the front of the battery housing, depending upon the battery design. In various embodiments, the terminal posts 36 also extend through a terminal post seal assembly to help prevent leakage of acid. It will be recognized that a variety of terminal arrangements are possible, including top, side or corner configurations known in the art.

FIG. 2 also shows an example of conventional cast-on-strap 38 which includes a rectangular, elongated body portion of a length sufficient to electrically couple each lug in a plate set and an upwardly extending member having a rounded top. FIG. 2 also illustrates a cast-on-strap 38 coupling lugs to a negative terminal 40. As shown in FIG. 2, according to various embodiments, the strap includes a body portion coupling the respective lugs in the end compartments and a post formed therewith to protrude through a cover.

Each cell element or chapter includes at least one positive plate 24, at least one negative plate 26, and optionally, a separator 32 positioned between each positive and negative plate. Separators 32 are generally provided between the plates to prevent shorting and undesirable electron flow produced during the reaction occurring in the battery.

Positive and negative electrode plates can be classified into various types according to the method of manufacturing the same. As one example, a paste type electrode is shown in FIGS. 3-5. In various embodiments, the paste type electrode includes a grid substrate 42, 46 and an electrochemically active material or "paste" 48, 50 provided on the substrate. The grid may be formed of a soft alloy containing a trace of calcium for enhancing the mechanical strength of the substrate.

Referring to FIGS. 3-5, the positive and negative plates 24, 26 each comprise a lead or lead alloy grid 42, 46 that supports an electrochemically active material 48, 50. The grids provide an electrical contact between the positive and negative active materials or paste 48, 50 which serves to conduct current. The grids 48, 50 as indicated also serve as a substrate for helping support electrochemically active material (e.g., paste) deposited or otherwise provided thereon during manufacture to form battery plates.

As set forth in greater detail below, known arts of lead acid battery grid making include: (1) batch processes such as book mold gravity casting; and (2) continuous processes such as strip expansion, strip stamping, continuous casting, and continuous casting followed by rolling. Grids made from these processes tend to have unique features characteristic of the particular process and behave differently in lead acid batteries, especially with respect to the pasting process. It should be appreciated that grids formed from any conventional or later-developed grid manufacturing process may be utilized, and it is not the intent to limit the invention to the grid design disclosed herein.

In various embodiments, at least some of the grids are stamped grids. FIG. 3 illustrates one or more examples of embodiments of a stamped grid 42 (e.g. a grid for a positive plate) with active material or paste 48 provided thereon. FIG. 4 illustrates the stamped grid 42 shown in FIG. 3, but without active material. In various embodiments, the stamped grid 42 includes a frame that includes a top frame element 52, first and second side frame elements 54, 56, and a bottom frame element 58. In various embodiments, the stamped grid 42 includes a series of grid wires 44 that define open areas that help hold the active material or paste 48 that helps provides current generation. In various embodiments, a current collection lug 60 is integral with the top frame element 52. While FIGS. 3-4 depict the lug 60 as offset from the center of the top frame element 52, the lug may alternatively be centered or positioned closer to either the first or second side frame elements 54, 56. The top frame element 52 may include an enlarged conductive section at least a portion of which is directly beneath the lug 60 to optimize current conduction to the lug.

The bottom frame element 58 may be formed with one or more downwardly extending feet (not shown) for spacing the remainder of the grid 42 away from the bottom of the battery container. In various embodiments, at least some of the wires 44 increase in cross-sectional area along their length from bottom to top or have a tapered shape so as to optimize the current carrying capacity of the wires to help carry away increasing current being generated from the bottom to the top. The width and spacing of the wires 44 between side elements 54, 56 may be predetermined so that there are substantially equal potential points across the width of the grid 42. To assist in supporting the electrochemical paste 48 and/or permit the formation of paste pellets, in various embodiments, the stamped grid 42 also includes horizontal wires 62 which are equally spaced apart and are parallel to the top and/or bottom frame elements 52, 58. As shown in FIG. 3-4, however, at least some of the horizontal wires 62 may not be equally spread apart or parallel to the top and/or bottom frame elements.

Various stamped grid designs may be utilized. See, e.g., U.S. Pat. Nos. 5,582,936; 5,989,749; 6,203,948; 6,274,274; 6,921,611; and 6,993,641; and U.S. patent application Ser. Nos. 10/996,168; 11/086,525; 10/819,489; and 60/904,404, each of which are incorporated herein by reference in their entireties. It should be noted that an infinite number of grid designs may be utilized and therefore, it is not the intent of the following description to limit the invention to the grid design shown in FIGS. 3-5, which are presented for the purposes of illustration.

One or more examples of embodiments of an expanded metal grid 46 (e.g. a grid for the negative plate) are illustrated in FIG. 5. In various embodiments, the expanded metal grid 46 has a pattern (e.g., a diamond pattern such as that shown in FIG. 5), which is well known in the art, with a bottom frame element 64, and a top frame element 66 that is integral with a lug 68.

Referring to FIGS. 3-5, the cross-section of the grid wires 44 may vary depending upon the grid making process. To help improve adhesion of the battery paste, however, in various embodiments, the grid wires may be mechanically reshaped or refinished. It should be appreciated that any number of grid wire shapes may be utilized as long as the shape provides suitable paste adhesion characteristics. For example, the cross section of wires may be of any cross-section design including substantially oval shaped, substantially rectangular, substantially diamond shape, substantially rhomboid shape, substantially hexagon shape, and/or substantially octagon shape. In the battery grid, each grid wire section may have a different cross-sectional configuration, or each grid wire section may have the same or a similar cross-sectional configuration. However, it is preferred that each grid wire section have the same cross-sectional configuration. Depending on the needs, a grid can be deformed at the vertical wire elements only, the horizontal wire elements only, or at both the vertical and horizontal wire elements.

The active material or paste 48, 50 is typically a lead-based material (e.g. PbO, $PbO_2$, Pb or $PbSO_4$ at different charge/discharge stages of the battery) that is pasted, deposited or otherwise provided onto the grids 42, 46. The paste composition may be determined by power requirements, cost and battery environment, as it is known in the art. In various embodiments, the active material of a lead-acid battery is prepared by mixing lead oxide, sulfuric acid and water. The lead oxide reacts with the sulfuric acid to form mono-, tri- and/or tetrabasic lead sulfate(s). Dry additives, such as fiber and expander, may also be added to the active material. For example, in various embodiments, expanders such as finely-divided carbons (e.g. lampblack or carbon black), barium sulfate and various lignins may be included in the active material. In various embodiments, the mixture is then dried and water is re-added to form a paste of the desired consistency.

The active material 48 provided on the positive grid 42 (e.g. lead dioxide [$PbO_2$]), is typically in micro-particle form, so that the electrolyte is allowed to diffuse and permeate through the lead dioxide microparticles on the positive electrode plate 24. The spongy lead, the active material 50 of the negative electrode plate 26, is typically porous and reactive, so that the electrolyte is allowed to diffuse and permeate through the sponge lead on the negative electrode plate.

As shown in FIG. 2, in various embodiments, active materials 48, 50 are deposited in paste form on the positive and negative grid 42, 46 to create the positive plate 24 and negative plate 26, respectively. To prevent the separation of active materials 48, 50 from the plates, and to improve handling of the active materials in the manufacture of electrodes 24, 26, a pasting material or paper 70 is provided to the active material after deposition on the grids. The pasting paper 70 may be provided in or on an electrode 24, 26 of a lead acid battery. In particular, the pasting paper or material 70 may be adhered or otherwise provided on at least one of the surfaces of the active material 48, 50 as, among other things, a support to the active material after deposition on the grids 42, 46. Each electrode 24, 26 may be provided with a pasting material 70 and the electrodes may be placed in close proximity to each other within the battery 22. In one or more examples of embodiments described herein, the distance between adjacent electrodes 24, 26 may range from approximately 1.0 mm to approximately 4.0 mm such that the pasting materials of the adjacent electrodes may contact each other or at least be in close proximity to each other. While specific ranges are provided, it is contemplated that the pasting materials or electrodes may otherwise be placed in relative close proximity suitable to accomplish the purposes of the present invention.

Figure 6:
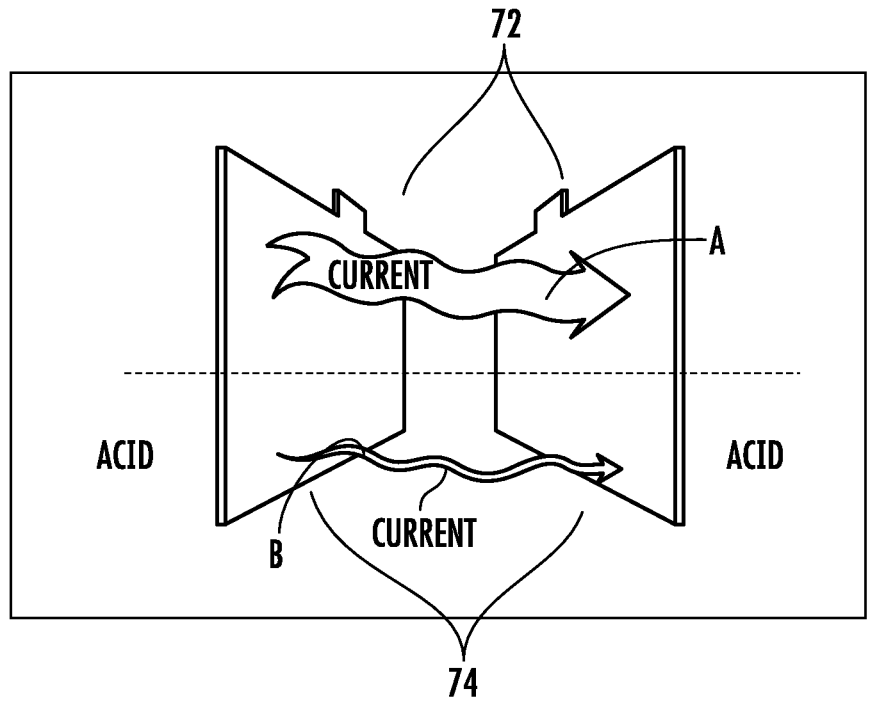
FIG. 6 is a schematic representation of the relative current density passing between two electrodes (e.g., an anode and a cathode) of a conventional battery or pre application of the pasting material according to one or more examples of embodiments.

In one or more examples of embodiments, the pasting material 70 described herein is used to provide a more uniform current density across or between the electrodes 24, 26. FIG. 6 shows the current density between two plates or electrodes 24, 26 of a typical lead acid battery 22. As shown in FIG. 6, the current (A) may be more dense toward the top 72 of the electrodes, such as for example closer to a collection lug 60, 68 of each electrode 24, 26, and the current (B) may be less dense toward the bottom 74 of the electrodes, such as for example further from the collection lug of each electrode. The non-uniform nature of the current density in a typical lead acid battery can result from a non-uniform internal resistance within the battery. There may be less resistance between two electrodes 24, 26 closer to the collection lugs 60, 68 of those electrodes than farther from the lugs. As a result, more current may flow (A) in areas of decreased resistance (e.g., closest to the terminals 36). The decreased current flow (B) towards the bottom 74 of the electrodes (e.g., areas of increased resistance), at least in relation to the areas of decreased resistance shown in FIG. 6, can contribute to acid stratification and/or an increase in the production of lead sulfates. The resulting acid stratification and/or production of lead sulfates may further reduce the current flow in these regions due to, for example, a reduction in the available active material in the electrode, and may eventually lead to a premature failure of the battery.

Figure 7:
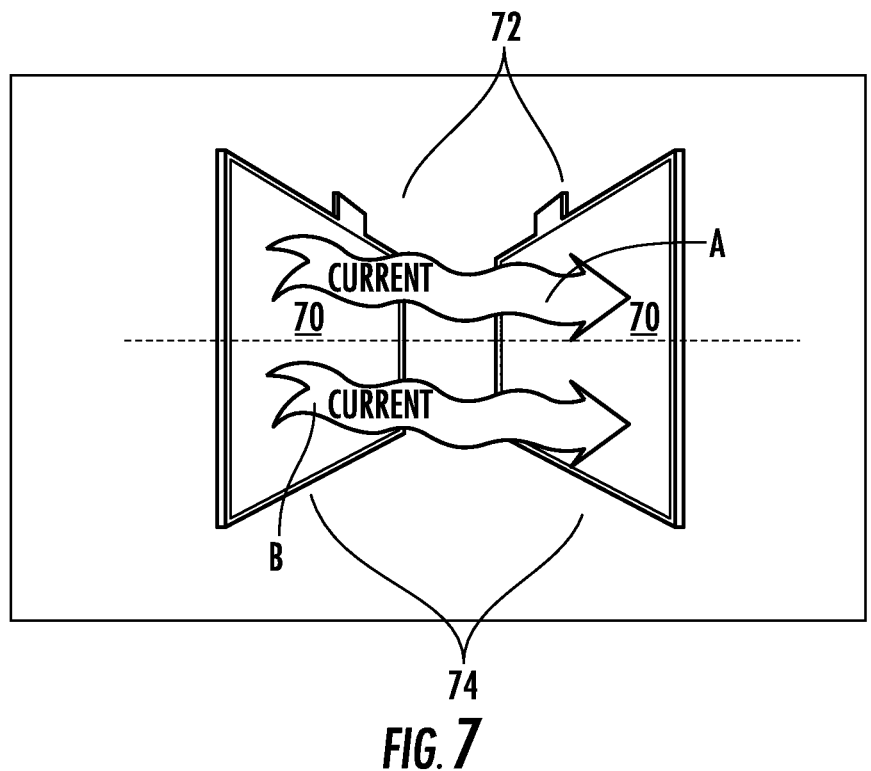
FIG. 7 is a schematic representation of the relative current flow passing between two electrodes (e.g., an anode and a cathode) of a battery with a pasting material according to one or more examples of embodiments.

By comparison, FIG. 7 shows a more uniform current density across the electrodes that may result from the use of a pasting material 70 according to one or more examples of embodiments described herein. In various embodiments, the current density (A) closest to the collection lugs 60, 68 of the electrodes 24, 26 may be decreased by increasing the resistance of the electrode in this location, at least relative to the resistance further from the collection lugs of the electrode, which may also increase current density (B) further from the collection lugs of the electrode. In various embodiments, the resistance of the electrodes 24, 26 in regions farther from the collection lugs 60, 68 may be reduced, at least relative to the resistance closer to the collection lugs, to increase the current density in such regions. It should be appreciated that increasing a resistance in a first area may have the same relative effect as decreasing a resistance in a second area.

The pasting material 70 may be formed or made of any suitable material for the purposes provided herein. According to the present invention, the pasting material 70 may be formed of one or more papers, woven fabrics, and/or non-woven fabrics such as but not limited to non-woven fabrics formed of polyesters, polypropylenes, or viscose rayon. For example, the pasting material may be paper or porous nonwoven fabric having micron-sized pores. As another example, the pasting material may be a nonwoven fabric synthesized from thermoplastic resin by spun-bonding or thermal-bonding.

The pasting material 70 may be provided with varying density and/or thickness to provide for varying resistance. To this end, the pasting material may vary continually (e.g., linearly), and/or incrementally (e.g., in a stepped manner) between two positions. For example, the density and/or thickness of the pasting material 70 may gradually increase in a linear manner from or between a top edge or portion 72 of the electrode 24, 26 towards a bottom edge or portion 74 of the electrode. The density and/or thickness of the pasting material 70 may also vary in a number of incremental steps from or between the top edge of the electrode toward the bottom edge of the electrode. It should also be appreciated that the density and/or thickness of the pasting paper or material may vary in one or more dimensions. For example, rather than the density gradually varying from the top edge toward the bottom edge, the density may vary in a more radial, three-dimensional fashion away from a region or single point such as but not limited to the lug of the electrode. Preferably, the density of the pasting material is provided in a form or arrangement that maximizes the uniform current distribution or uniform current density between adjacent electrodes. In one or more alternative examples of the pasting material, current density can also be varied to increase resistance near the top of the plate and to distribute or force more current density lower in the electrode.

Figure 8:
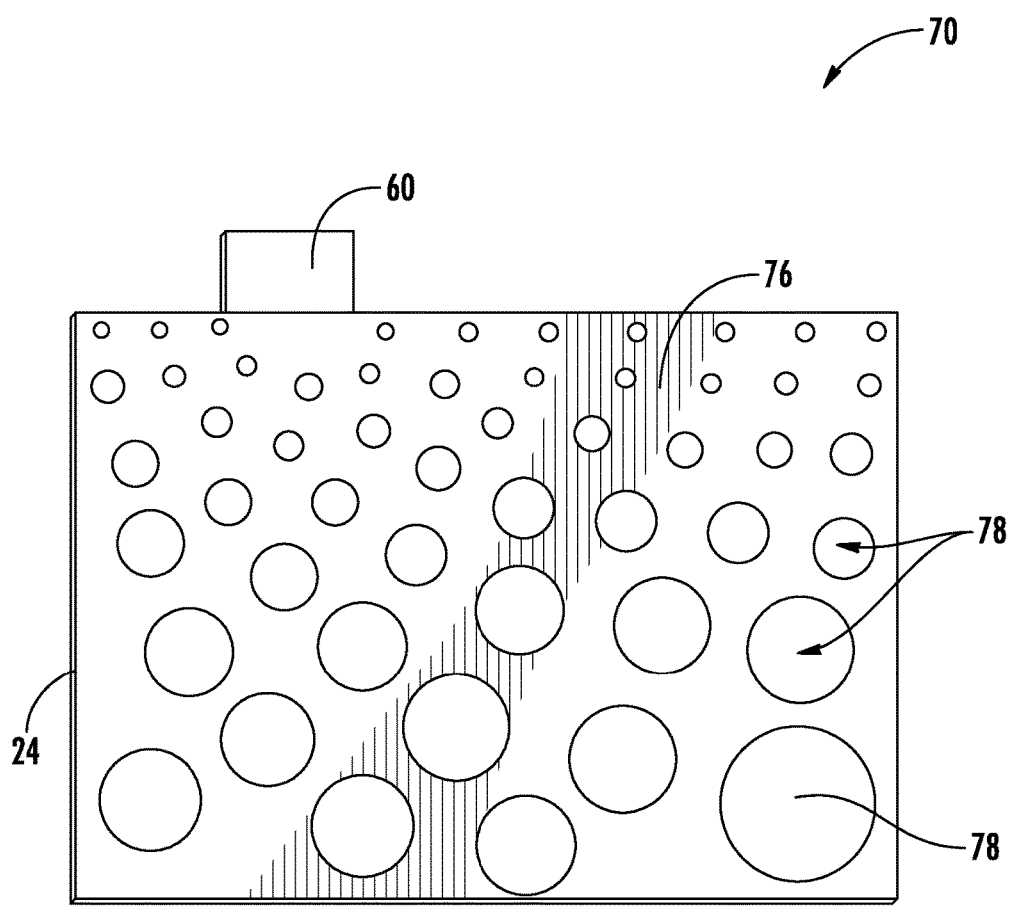
FIG. 8 is a front plan view of an electrode provided with a pasting material according to one or more examples of embodiments.

In one or more examples of the pasting material 70 usable in the manufacture of a lead acid battery, a pasting material 76 may define or include apertures or pores 78 that are mechanically formed, naturally occurring, pre-formed, or otherwise provided in the pasting paper or material. The apertures or pores 78 defined in the pasting paper or material 76 may vary in size and/or density to follow the current flow of a grid or electrode, or more specifically to correspond with the current distribution profile of the electrode. For example, the pores may be provided such that the pasting paper 76 may be least porous closest to a collection lug 60, 68 of the electrode 24, 26 and may be most porous furthest from the collection lug of the electrode. More specifically, the material 76 may be least porous where the current is traditionally or typically the most dense and may be most porous where the current is traditionally or typically the least dense between electrodes, or otherwise causing more current at the furthest point from the collection lug. FIG. 8 shows a battery electrode 24 provided with one or more examples of embodiments of a pasting material 76. The pasting material defines or is formed of or includes one or more pores, apertures, or openings 78. In the illustrated embodiment, a plurality of pores 78 are provided spaced across a pasting material or sheet or paper. The pores 78 may vary in size and/or frequency to help reduce the relative density of the pasting paper further from the lugs. Larger or a greater volume of pores generally may provide a greater or easier current flow. While a specific battery electrode and arrangement of pasting material is illustrated in the Figures and described herein, alternative forms of electrode and arrangements of pasting material and pores may be acceptable for the purposes provided. It should also be appreciated that, although the pores 78 in the pasting paper are shown in the Figures as circular and macroscopic pores 78 (e.g., visible to an unaided eye), the pores 78 may be any size and shape. According to various examples of embodiments, the pores 78 are microscopic and not visible to an unaided eye. Further, varying size and shape pores may be provided in any suitable pattern to accomplish the intended purposes.

Figure 9:
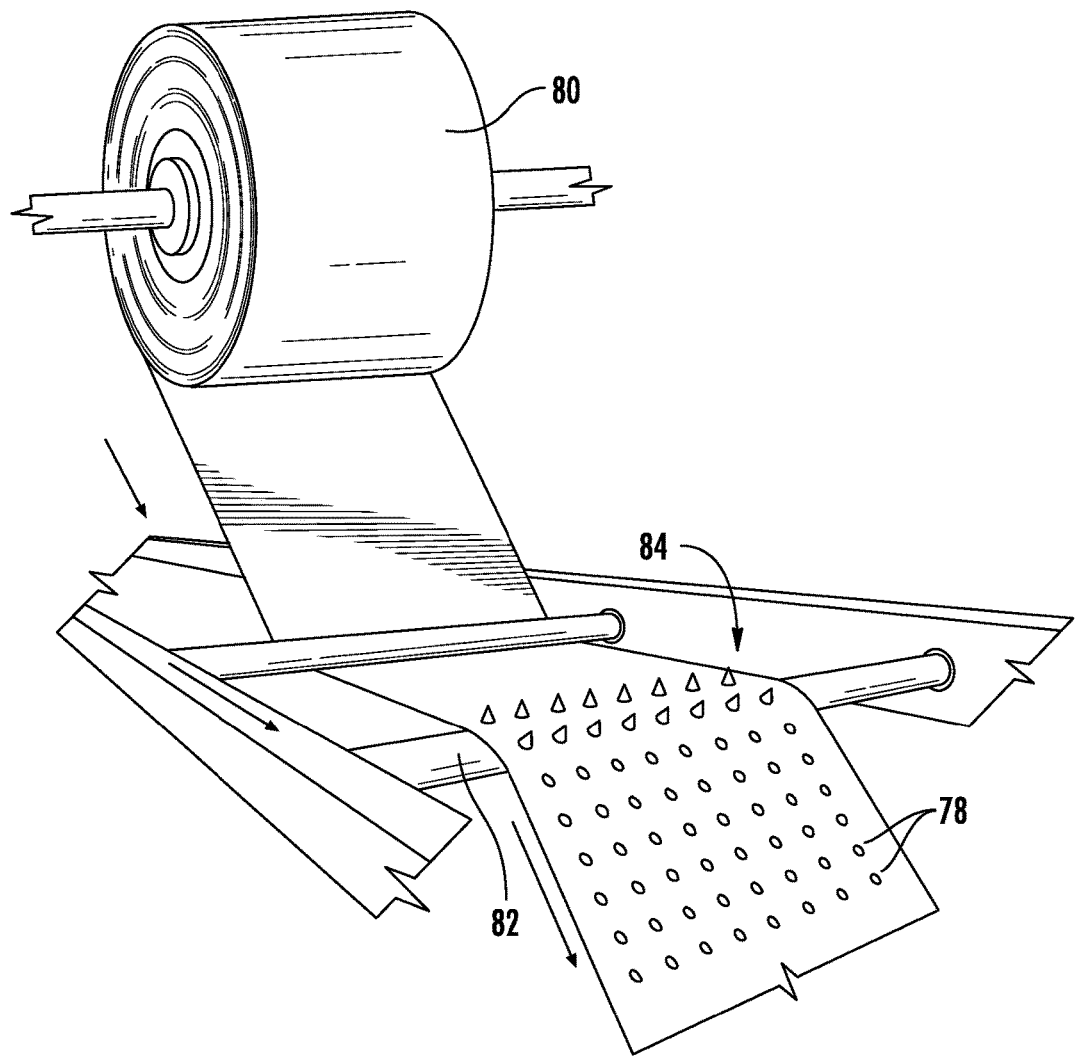
FIG. 9 is a perspective view of a method of manufacturing or modifying a pasting material shown in FIG. 8 according to one or more examples of embodiments.

The pasting material or paper 76 of FIG. 8 may be formed in or by any suitable manner. FIG. 9 shows one or more examples of method of providing a pasting paper or material of FIG. 8 with varying density or pores 78. In various embodiments, the pasting material 76 may be perforated by any known or later-developed method. The pasting material 76 may be perforated according to any desired pattern to create a varying density by size and/or frequency of the perforations or pores 78 in the pasting paper or material. As outlined above, the perforations 78 may be macroscopic, microscopic, round and/or any other shape and/or size. In general, the size and/or frequency of the pores 78 provided in the pasting paper 76 may increase in regions that will be provided around an electrode 24 farthest from a collection lug 60 of the electrode and may decrease in regions that will be provided closest to the collection lug of the electrode, or at least vary in relation to respective spaced apart regions.

The pasting paper or material 76 may be provided on a roll or other feed device 80. The pasting paper 76 may be provided on continuous or separate sheets. The pasting material 76 may be passed over a punch or die 82 or other device or a plurality of such devices having one or more shaped protrusions 84 of one or more shapes and one or more sizes. The die 82 may further be movable or rotatable to position the respective protrusions 84 for suitable placement of pores 78 on the pasting material 76. While large protrusions 84 are shown in FIG. 9 for ease of illustration, the protrusions may be of any size to accommodate manufacturing or desired resistance properties. Before being applied to the plates 24, 26, the pasting material is or may be perforated as described above via an adapted manufacturing device.

In one or more examples of the pasting material described herein, the pasting material 70 is usable in the manufacture of a lead acid battery and may include a varying density, thickness and/or resistance. The pasting material 70 may be wrapped around an electrode or otherwise applied to a surface or portion of a surface of an electrode in a lead acid battery such that the pasting paper may be more dense, thicker and/or may have a greater resistance in a particular region of the electrode, such as closer to a collection lug of the electrode, and may be less dense, thinner and/or may have a lower resistance in a second region, such as further from the collection lug.

Figure 10:
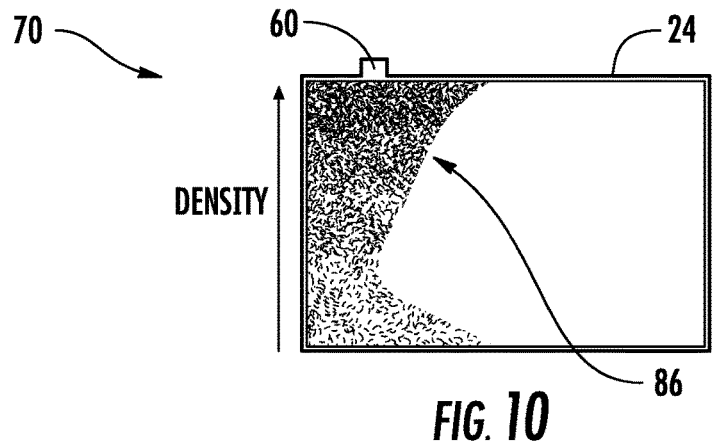
FIG. 10 is a front plan view of an electrode provided with a pasting material according to one or more examples of embodiments.

FIG. 10 shows one or more examples of a pasting paper or material 70 on an electrode 24 according to this invention. While a specific electrode and pasting material arrangement are shown in the Figures, alternative pasting material arrangements and electrodes are acceptable for the purposes provided. In this embodiment, the pasting material 86 may be chemically or physically treated or altered such that the material has a varying density and/or varying inherent resistance. As one non-limiting example, a chemical may be added to any known or later-developed pasting material 86 to increase or decrease the density and/or inherent resistance of the pasting material in desired regions. The pasting material 86 may also be manufactured or physically altered to have a varying density or varying inherent resistance due to a variation in a physical characteristic. For example, the paper 86 may be manufactured to have a non-uniform density and/or thickness. In general, the thickness, density and or resistance of the pasting material may increase or be higher in regions closest to a lug 60 of an electrode and may decrease in regions furthest from the lug of the electrode, or at least vary in relation to respective spaced apart regions.

Figure 11:
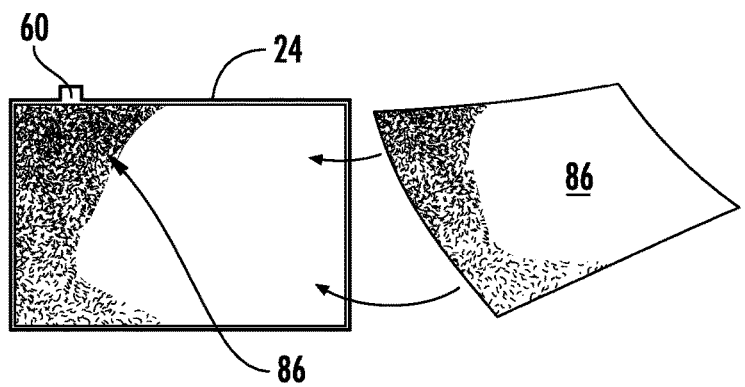
FIG. 11 is a perspective view showing one or more examples of the application of a pasting material to an electrode.
Figure 12:
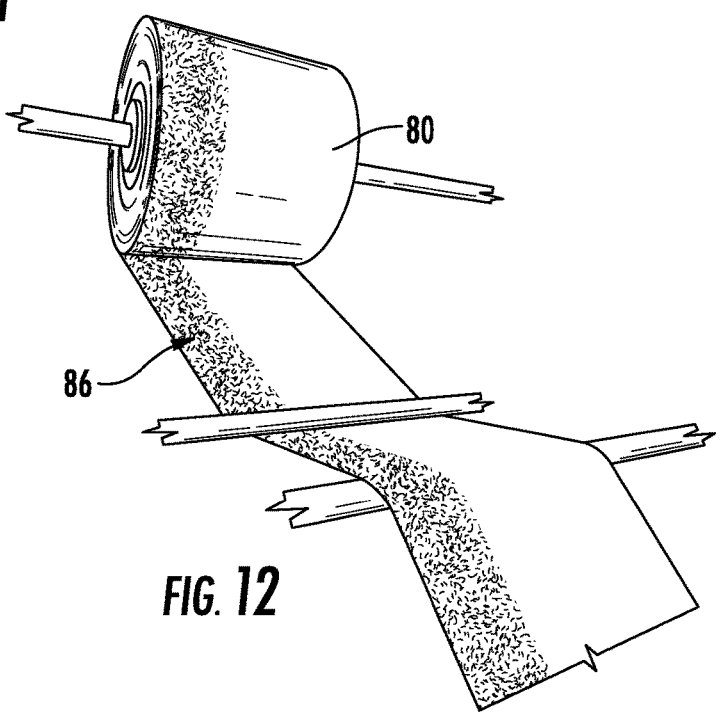
FIG. 12 is a perspective view of a method of providing a pasting material for use in manufacturing, according to one or more examples of embodiments.

FIGS. 11-12 show one or more examples of a pasting paper 86 of FIG. 10 and the application thereof on an electrode 24 for use in a manufacturing process. The pasting paper or material 86 illustrated in FIGS. 11-12 shows a paper or material 86 of FIG. 10 in sheet form (FIG. 11) and in a continuous sheet on a roll (FIG. 12) which may be segmented or otherwise cut to fit for use with the plates of the present invention. However, any of the pasting materials described herein may be substituted in place of the pasting material illustrated in FIGS. 11-12 without departing from the overall invention. In addition, the pasting material may be provided in alternative forms or otherwise formed or fed in known or future developed methods without departing from the overall purposes provided herein.

In one or more alternative examples of the pasting paper 70, a battery electrode 24 may be provided with two or more layers of pasting material. While a specific electrode and pasting material arrangement are shown in the Figures, alternative pasting material arrangements and electrodes are acceptable for the purposes provided. In one or more examples, a first portion 88 of the electrode 24 may be wrapped with or applied with a first layer of pasting material 90 and a second portion 92 of the electrode may be wrapped with or applied with the first layer of pasting material 90 and a second layer of pasting material 94. The first portion 88 may be closer to a particular region, such as a collection lug 60, of the electrode in comparison to the second portion 92.

Figure 13:
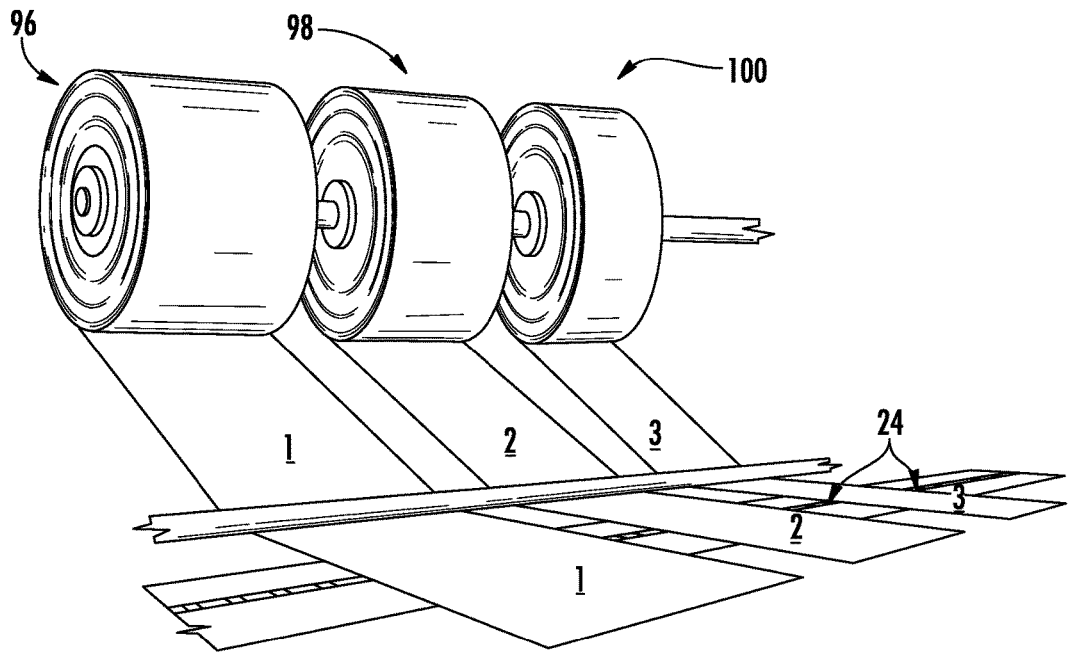
FIG. 13 is a perspective view of a method of providing a pasting material shown in FIG. 14 according to one or more examples of embodiments.
Figure 14:
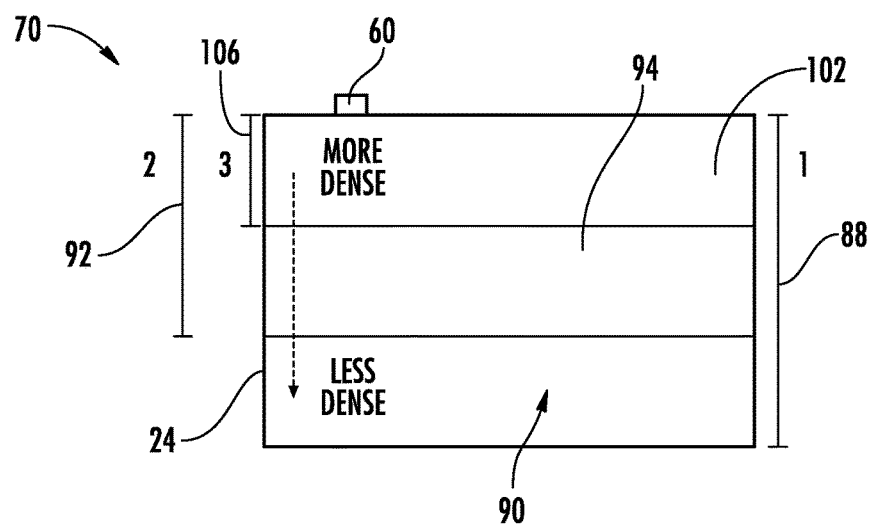
FIG. 14 is a front plan view of an electrode provided with a pasting material according to one or more examples of embodiments.

FIGS. 13 and 14 depict a method of providing an electrode 24 with a pasting material or paper 70 having a varying resistance according to one or more alternative examples of embodiments. In particular, the pasting material may be layered to build density in different regions of the plate or electrode, with the least layered portion (e.g., a single layer) being the least dense and having the greatest current. As shown in FIG. 13, three rolls of pasting material 96, 98, 100 of different sizes and/or types of pasting material are provided. As shown in FIG. 14, the rolls of pasting material 96, 98, 100 are provided or secured to the plate in overlapping layers 90, 94, 102. In one or more examples, the plate 24 is pre-cut before application of the layers but cutting the plate after application of the layers would not depart from the purposes provided herein. In various embodiments, pasting material from the first roll 96 is provided substantially on a face or surface of the electrode 24 to provide a first layer 90; pasting material from the second roll 98 is provided in a second layer 94 over a face or surface of the electrode 24 and material from the first roll 96, and in the illustrated example, substantially over the top two thirds of the face and material from the first roll; and pasting material from the third roll 100 is provided over the pasting material from the first and second rolls 96, 98, as well as over the electrode 24, and in the illustrated example substantially over the top third or third portion 106 of the electrode. As such, in the illustrated example approximately the top third of the electrode may have three layers of pasting paper or material (i.e., each of the three rolls 96, 98, 100 is applied to this area), approximately the middle third may have two layers of pasting paper or material (i.e., the first roll and second roll 96, 98 are applied to this area) and approximately the bottom third of the electrode may have one layer of pasting paper or material (i.e., only the first roll 96 is applied to this area). While the illustrated example shows a substantially segmented arrangement in thirds (⅓ s), it is understood that the respective areas may vary so as to increase or decrease each respective area. The areas that have more layers of paper or material (e.g., towards the collection lug or top of the electrode) may have an increased density of pasting material and an increased resistance, at least relative to other portions or regions of the electrode.

It should be appreciated that any number of rolls of pasting material can be used to apply any number of layers of pasting material to the electrode 24, 26. For example, two rolls, four rolls or more than four rolls could be used to apply different amounts of pasting material to different parts of the electrode. It should also be appreciated that, rather than overlapping the layers, separate types of pasting material that have different thicknesses, densities and/or inherent resistances may be provided adjacent to each other. These varying types of materials may also be overlapped. It should also be appreciated that the material need not be provided from rolls. Any material source(s) and/or manufacturing methods may be utilized. To this end, a method for manufacturing a battery electrode 24, 26 is provided. The method may include wrapping or applying at least a first portion 88 of the electrode with a first pasting material 90 and wrapping or applying at least a second portion 92 of the electrode with a second pasting material 94. The first portion 88 may be closer to a collection lug 60 of the electrode than the second portion 90, or at least may be positioned in this relation in respective spaced apart regions; and/or the first pasting material may have a higher resistance, thickness and/or density than the second pasting material.

It should also be appreciated that the above-outlined examples of embodiments may be used individually or in combination with each other or other embodiments. For example, multiple rolls of pasting material may be provided with pores 78 of different sizes and/or density and provided to separate regions of an electrode. Likewise, in addition to being provided with pores 78 of varying size and/or density, a pasting material may be treated chemically or otherwise physically altered to create pasting material with varying resistance or density.

The pasting material 70 may also help eliminate or reduce the need for separators 32 in the battery 22. As outlined herein, a lead acid battery may optionally include separators 32 between any two adjacent electrodes 24, 26 to help prevent unintentional electrical flow (e.g., shorts) between the electrodes. A pasting material 70 having a thickness great enough to provide suitable clearance between electrodes while at the same time allowing electrolyte or acid migration may be provided. In various embodiments, the pasting material 70 according to this invention is of substantial thickness, density, and/or has other characteristics, at least in one or more regions, which may substantially or partially insulate adjacent electrodes from each other. To this end, pasting material or paper 70 may be usable in the manufacture of or otherwise provided in a lead acid battery 22 without the use of a separator. The pasting material 70 in this example is of suitable thickness to be insulative and/or non-electrically-conductive. In one or more examples, the pasting material may be formed of a thick poly-material. In one or more examples, the pasting material 70 may range from approximately 0.3 mm to approximately 2.0 mm in thickness with or without ribs, and more preferably from approximately 0.5 mm to approximately 2.0 mm, or approximately 0.5 mm to approximately 1.0 mm in thickness with or without ribs. While specific ranges are provided, it is contemplated that the pasting materials may otherwise be provided with relative density or thickness suitable to accomplish the purposes of the present invention. The pasting material or paper 70 may be applied to a single side of the electrode or both sides of the electrode as it is pasted. It should be appreciated that the pasting material 70 may be ribbed or otherwise varying in thickness.

The pasting material 70 may also be permeable to an electrolyte or acidic electrolyte of the battery 22. In addition, in various examples of embodiments, the pasting material 70 that is usable in connection with or to replace a separator of the battery may assist in or otherwise support the weight of the electrodes 24, 26 thereby reducing the need for the electrodes to support their own weight and may allow for electrodes to be made of different materials (e.g., the electrodes may include more pure lead content) or may allow for thinner electrodes or grids.

As indicated, in various examples of embodiments the pasting material 70 is utilized to replace a separator of the battery. In various ones of these examples of embodiments, the use of the pasting material and/or the absence of the separator also advantageously makes the battery more recyclable, biodegradable, "green" and/or otherwise more environmentally friendly. In various examples of embodiments, the utilization of the pasting material to replace the separator also results in electrodes that dry and/or cure more quickly and/or in a more uniform manner. In various examples of embodiments, the electrodes, which include a pasting material that can be utilized to replace a separator of the battery, can also be stacked during a curing process and help provide an increase in the amount of air flow around the electrodes during a chemset process.

While not required in one or more examples of embodiments, in various alternative embodiments one or more battery separators 32 are used to conductively separate the positive and negative electrodes 24, 26. The separator material is typically microporous to allow the through passage of ions from the positive and negative electrodes. Separators 32 for automotive batteries are typically made in continuous lengths and rolled, subsequently folded for example as shown in FIG. 5, and sealed along one or more of their edges to form pouches that receive a battery plate (e.g. a negative plate as shown in FIG. 5 or a positive plate as shown in FIG. 2).

In various embodiments, separator material 32 generally has a substantially uniform thickness and a substantially uniform pore distribution. The pore distribution helps ensure an overall uniform current density across the electrodes during operation, thereby helping achieving a uniform charging and discharging of the electrodes and maximum battery efficiency. A separator 32 generally incorporates one or more ribs 104 (e.g. as shown in FIG. 5) to help stiffen the separator.

The separator material 32 may be constructed of a variety of materials (e.g. polyolefin, rubber, phenol-formaldehyde resorcinol, glass mat, microporous PVC, and sintered PVC). In various embodiments, the separator is comprised of a microporous sheet comprised of high molecular weight polyolefin. Examples of polyolefins that may be used include polyethylene, polypropylene, polybutene, ethylene-propylene copolymers, ethylene-butene copolymers, propylene-butene copolymers and ethylene-propylene-butene copolymers.

In various embodiments, the separator 32 is also constructed of an inert filler material. The filler can be soluble or insoluble in water. However, the filler may provide the primary means by which any plasticizer is absorbed and held in the composition and should not be soluble in the plasticizer. The preferred filler is dry, finely divided silica. However, other fillers (e.g. carbon black, coal dust, graphite, metal oxides and hydroxides, metal carbonates, minerals, zeolites, precipitated metal silicates, alumina silica gels, wood flour, wood fibers and bark products, glass particles, salts such as barium sulfate, inorganic salts, acetates, sulfates, phosphates, nitrates, carbonates and/or combinations thereof) may be utilized. It should also be understood that any known or later-developed wetting agents (e.g. sodium alkyl benzene sulfonate, sodium lauryl sulfate, dioctyl sodium sulfosuccinate, and isoctyl phenyl polyethoxy ethanol) may be utilized to enhance the wetability of the filler.

In various embodiments, a separator 32 also includes at least one plasticizer. The plasticizer may be soluble or insoluble in water. Examples of plasticizers that may be used include organic esters, epoxy compounds, phosphate esters, hydrocarbon materials, and low molecular weight polymers.

In various embodiments, the separator 32 is comprised of a stabilizer or an antioxidant. In various embodiments, conventional stabilizers or antioxidants such as 4,4 thiobis (6-tert-butyl-m-cresol) ("Santonox"), and, 2,6-di-tert-butyl-4-methylphenol ("Ionol") may be utilized.

When the separator 32 is provided with one or more ribs 104, the ribs may be formed from a number of known or later-developed polymeric compositions (e.g. the same composition as the separator, other polyolefins, polyvinyl chloride, and/or filled or foamed compositions thereof). The ribs 104 may be provided in any number of ways. For example, the ribs may be formed by extrusion (either unitarily with the sheet or separately). The ribs 104 may also be formed by grooving or embossing. When ribs are molded separately, they may be bonded or otherwise coupled to the sheet or base web by any number of methods known in the art including heat sealing or by an adhesive.

While a particular rib configuration is shown in FIG. 5, one skilled in the art will appreciate that any variety of rib configuration may be utilized depending at least in part on the grid design, plate design and/or battery.

The thickness of a separator 32, and to this end the thickness of a pasting material 70 used without a separator, will or may vary depending upon the type of battery 22 in which it is used. In general, the thickness of the base web can range from 1 to 50 mm. For lead-acid batteries, the preferred thickness range is typically 10 to 40 mm. The height of each rib 104 may vary over a wide range depending upon plate spacing requirements. Generally, ribs from 5 to 200 mm in height from the base are provided, with the preferred range being 10 to 100 mm.

Various chemistries in which the electrochemical potential between various materials is used to generate electricity have been studied and commercially implemented. See, in general: Besenhard, J. O., Ed., *Handbook of Battery Materials*, Wiley-VCH Verlag GmbH, Weinheim, Germany, 1999; and Linden, D., Ed., *Handbook of Batteries*, Second Edition, McGraw Hill Inc., New York, N.Y., 199, both of which are incorporated herein by reference.

A plate 24, 26 for a lead-acid battery is conventionally made by applying active material or paste to a conductive support such as a lead alloy grid. Plates can be classified according to the method of manufacturing the same. For example, one process for producing battery plates includes an initial step of melting hot lead in a furnace, followed by a step of feeding molten lead alloy to a strip caster. In the strip expansion process, a cast or wrought lead strip is typically pierced, stretched above and below the strip plane, and then pulled or expanded to form a grid 46 with a diamond pattern. In various embodiments, the strip is coiled on a winder, and coils of lead alloy strip are stored for later use. In various embodiments, the strip may also be rolled. To form a battery grid, in various embodiments, the strip is fed through an expander that cuts, slits, and stretches a strip of coil to form the grids.

The grids may be produced using other known or later-developed processes. For example, as discussed above, the substrate may be formed by a casting process (e.g. by pouring a melted alloy into a mold), a stamping process, or by continuous rolling. During the manufacture of the grids or the plates, the grid wires may be refinished or reshaped (e.g. to improve adhesion of the paste).

The active material or paste 48, 50 as described herein is then applied to or otherwise provided (e.g. pasted by a conventional paster) on the expanded strip or wire grid 42, 46. In various embodiments, one or more pasting materials or pasting papers 70 are provided on one or both surfaces of the active material 48, 50. In various embodiments, the pasting materials or paper 70 may be provided in a continuous process.

In various embodiments, the grids 42, 46, active material 48, 50 and pasting material or paper 70 as described herein are fed to a divider where the strip is cut into plates 24, 26. Plates cut from the strip may be flattened or otherwise modified to help smooth out any uneven regions of paste. In various embodiments, the plates pass (e.g. on a conveyor) through an oven for flash-drying, and may then be stacked for later use. Conventionally, flash-drying may be performed using an open gas flame or an oven, e.g., as a 10-15 second drying of the plates in a conventional blast drying oven at about 260 deg C. (about 500 deg F.). After drying, the battery plates undergo a chemical treatment, well known to those skilled in the art. The pasted plates are next typically cured for many hours under elevated temperature and humidity to help oxidize any free lead and otherwise adjust the crystal structure of the plate.

Conventional polyolefin battery separators 32, if used, are typically produced by a process that comprises blending a composition of high molecular weight polyolefin, an inert filler material, and/or a plasticizer, forming the composition into sheet form, and subsequently extracting a portion of the inert filler and/or plasticizer from the sheet using a solvent.

After curing, the plates 24, 26 are assembled into batteries 22. Groupings of individual battery plates may be assembled, enveloped, interleaved or otherwise separated with separator material, and provided together to form plate sets 28. For example, in one common battery design, every other plate (e.g. each negative plate) in the battery set is inserted into a battery separator in the form of an envelope. The envelope acts as a separator between the plate in the envelope and the adjoining plates in the battery set. The plate sets are assembled in a container to help form a battery.

During assembly, the positive lugs 60 of the battery plates 24 are coupled together and the negative lugs 68 of the battery plates 26 are coupled together. This is typically accomplished using cast-on straps 38 formed by taking assembled battery stacks, inverting them, and dipping the lugs into molten lead provided in a mold. To permit current to follow throughout the battery, cast-on straps 38 of stacks are joined or coupled. Moreover, terminal electrodes 36 are provided which extend through the cover or casing to permit electrical contact with a vehicle's electrical system or other system requiring or intended to use battery power.

In various embodiments, the battery housing 30, including the cover 34, is provided containing the battery cells. In various embodiments, the battery housing 30 is submerged in acidic electrolyte fluid in order to fill the battery housing with electrolyte fluid through the fill tube holes in the battery cover 34. After filling the battery housing 30 with electrolyte fluid, the battery 22 is removed from the electrolyte fluid. Any residual electrolyte fluid coating, dust, and other debris may be washed away to prepare the battery for shipment. Before washing the battery housing external surfaces, the fill tube holes may be plugged to prevent washing fluid from entering the battery housing.

Following the initial wash, the batteries 22 are electrochemically formed by passage of current to convert the lead sulfate or basic lead sulfate(s) to lead dioxide (positive plates) or lead (negative plates). This is referred to as the "formation" process.

The electrode, lead acid battery and method of forming the electrode and/or battery provide various advantages over existing battery designs. For example, an electrode having the pasting material described herein provides for even current density between electrodes. As a result, the electrode and pasting material reduce, or at the least, do not contribute to acid stratification and/or sulfation within the lead acid battery. In addition, a pasting material as provided herein that is usable in connection with, or to replace a separator of the battery may assist in or otherwise support the weight of the electrodes, thereby reducing the need for the electrodes to support their own weight and may allow for electrodes to be made of different materials (e.g., the electrodes may include more pure lead content) or may allow for thinner electrodes or grids. Moreover, as indicated herein in various examples of embodiments, the use of the pasting material and/or the absence of the separator also advantageously makes the battery more recyclable, biodegradable, "green" and/or otherwise more environmentally friendly. The utilization of the pasting material to replace the separator also results in electrodes that dry and/or cure more quickly and/or in a more uniform manner. In addition, the electrodes which include a pasting material that can be utilized to replace a separator of the battery can also be stacked during a curing process and help provide an increase in the amount of air flow around the electrodes during a chemset process. These and other objects and advantages will be apparent from the foregoing description and appended claims.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the battery or electrodes as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

What is claimed is:

1. An electrode for a lead acid battery comprising:
   a surface;
   a pasting material distributed on the surface;
   wherein the pasting material has a property which varies across the surface of the electrode that provides uniform current density across the electrode.

2. The electrode of claim 1, wherein the pasting material has continual varying resistance across the surface of the electrode.

3. The electrode of claim 2, wherein the pasting material has a greater resistance closer to a collection lug of the electrode than a resistance further from the collection lug as measured across the surface of the electrode.

4. The electrode of claim 1, wherein the pasting material has varying density.

5. The electrode of claim 4, wherein the pasting material is chemically treated to provide the varying density.

6. The electrode of claim 1, wherein the pasting material is permeable to an electrolyte of the lead acid battery.

7. The electrode of claim 1 wherein the pasting material is non-electrically-conductive.

8. The electrode of claim 1 wherein the pasting material is insulative.

9. The electrode of claim 1, wherein the pasting material is wrapped around the electrode.

10. The electrode of claim 1, wherein the pasting material has a plurality of pores.

11. The electrode of claim 10, wherein the pores vary in size.

12. The electrode of claim 10, wherein the pasting material is least porous closest to a collection lug of the electrode.

13. The electrode of claim 1, wherein a first portion of the electrode has a first layer of pasting material and a second portion of the electrode has the first layer of pasting material and a second layer of pasting material.

14. The electrode of claim 13, wherein the first portion of the electrode is closer to a collection lug of the electrode than the second portion of the electrode.

15. The electrode of claim 13 wherein the first portion of the electrode includes only one layer of pasting material.

16. The electrode of claim 1, wherein the pasting material has incremental varying resistance.

17. The electrode of claim 1, wherein the pasting material comprises nonwoven fabric.

18. The electrode of claim 1, wherein the pasting material is comprised of multiple layers of pasting material.

19. The electrode of claim 1 wherein the pasting material provided on the surface of the electrode comprises an interface between the pasting material and electrode, and the property varies as measured across the interface between the pasting material and surface of the electrode.

20. A lead-acid battery having the electrode of claim 1.

21. An electrode for a lead acid battery comprising:
a surface;
a pasting material provided on the surface;
wherein the pasting material has a variable chemical treatment as measured across the surface of the electrode that provides uniform current density across the electrode.

22. The electrode of claim 21 wherein the pasting material provided on the surface of the electrode comprises an interface between the pasting material and electrode, and the variable chemical treatment varies across the interface between the pasting material and surface of the electrode.

23. A lead-acid battery having the electrode of claim 21.

* * * * *

UNITED STATES PATENT AND TRADEMARK OFFICE
CERTIFICATE OF CORRECTION

PATENT NO. : 10,205,157 B2
APPLICATION NO. : 15/175460
DATED : February 12, 2019
INVENTOR(S) : Ross et al.

Page 1 of 1

It is certified that error appears in the above-identified patent and that said Letters Patent is hereby corrected as shown below:

On the Title Page

1. In Item (73), under "Assignee", in Column 1, Line 2, delete "Johnson Controls Technology Corporation" and insert -- Johnson Controls Technology Company --, therefor.

In the Drawings

2. In Fig. 5, Sheet 2 of 7, delete Tag "105" and insert Tag -- 104 --, therefor.

In the Specification

3. In Column 1, Line 10, delete "Battery,"" and insert -- Battery," now Pat. No. 9,379,378, --, therefor.

4. In Column 5, Line 27, delete "grids 48, 50" and insert -- grids 42, 46 --, therefor.

Signed and Sealed this
Sixth Day of August, 2019

Andrei Iancu
*Director of the United States Patent and Trademark Office*